United States Patent [19]

Bobeck et al.

[11] 3,810,133

[45] May 7, 1974

[54] MAGNETIC DOMAIN REPLICATOR ARRANGEMENT

[75] Inventors: Andrew Henry Bobeck, Chatham; Irynej Danylchuk, Morris Plains, both of N.J.

[73] Assignee: Bell Telephone Laboratories, Incorporated, Murray Hill, N.J.

[22] Filed: Nov. 24, 1972

[21] Appl. No.: 309,205

[52] U.S. Cl. ...................... 340/174 TF, 340/174 SR
[51] Int. Cl. ...................... G11c 19/00, G11c 11/14
[58] Field of Search ................ 340/174 TF, 174 SR

[56] References Cited

UNITED STATES PATENTS

| | | | |
|---|---|---|---|
| 3,714,639 | 1/1973 | Kish et al. | 340/174 TF |
| 3,676,870 | 7/1972 | Bobeck | 340/174 TF |
| 3,743,851 | 7/1973 | Kohara | 340/174 TF |

OTHER PUBLICATIONS

IBM Tech. Disc. Bull., "Generation of Bubbles by Expansion" by Levi, Vol. 14, No. 6, 11/71, page 1876.

*Primary Examiner*—Stanley M. Urynowicz, Jr.
*Attorney, Agent, or Firm*—H. M. Shapiro

[57] ABSTRACT

A magnetic bubble replicate arrangement, when defined by magnetically soft elements which are very closely spaced with respect to one another, provides a variety of advantages such as enhanced operating margins and permits a more flexible memory organization.

15 Claims, 9 Drawing Figures

MAGNETIC DOMAIN REPLICATOR ARRANGEMENT

FIELD OF THE INVENTION

This invention relates to magnetic, single wall domains arrangement the most common ones of which are referred to as magnetic bubble devices.

BACKGROUND OF THE INVENTION

Copending application Ser. No. 160,841 filed July 8, 1971 now U.S. Pat. No. 3,723,716 for A. H. Bobeck and H. E. D. Scovil describes a "field access" bubble device. The particular arrangement disclosed in that application comprises a "fine-grained," periodic pattern including a plurality of magnetically soft elements in each stage thereof. The elements of each stage are operative in concert in response to a magnetic field rotating in the plane of a layer in which bubbles move, to move either bubbles or strip domains to the next stage. U.S. Pat. No. 3,618,054 of P. I. Bonyhard, U. F. Gianola, and A. J. Perneski describes a "major-minor" organization for bubble memories which is implemented primarily with a pattern of magnetically soft elements which can be a finegrained pattern.

Memories of the major-minor type store information permanently in recirculating loops called minor loops. The information is selectively transferred to an accessing loop, called a major loop, where bubble generation, annihilation, and sense operations occur. The transfer of information between the loops is accomplished at transfer positions defined by magnetically soft elements and electrical conductors as is well known.

Subsequent to the generation or sense operations, information in the major loop is returned, via the transfer positions, to the minor loops for storage. A replication rather than a transfer operation, at this juncture of the operation, obviates the necessity of returning information to the minor loops and thus improves data rates.

Arrangements for direct readout from multiple recirculating loops, such as the minor loops of a majorminor memory, similarly require replication operations for transferring data (for example) to a decoding circuit (rather than to a major loop) while ensuring permanent data storage in the loops. A suitable decoder circuit for this type of readout is disclosed in copending application Ser. No. 288,255 filed Sept. 12, 1972 for P. I. Bonyhard.

BRIEF DESCRIPTION OF THE INVENTION

The present invention is directed at a bubble replicator defined by a fine-grained pattern of magnetically soft elements and usable in a major-minor type memory. In accordance with one embodiment of this invention, the elements define first and second bubble channels which come into close proximity at a replication position. An electrical conductor coupled to the domain layer at the replication position is operative, in response to a pulse of a first polarity, to stretch a domain in one of the channels into a strip domain corresponding to the elements of the two channels there. The domain to be replicated is moved by a rotating in-plane field into position astride the conductor for cutting. The strip domain is cut in response to a pulse of a second polarity applied to the conductor.

In another embodiment of this invention, an "all permalloy" replicator eliminates the need for two-level masking usually necessary in the manufacture of devices requiring both a pattern of magnetically soft material and a pattern of electrically conducting material.

DETAILED DESCRIPTION

Figure 1:
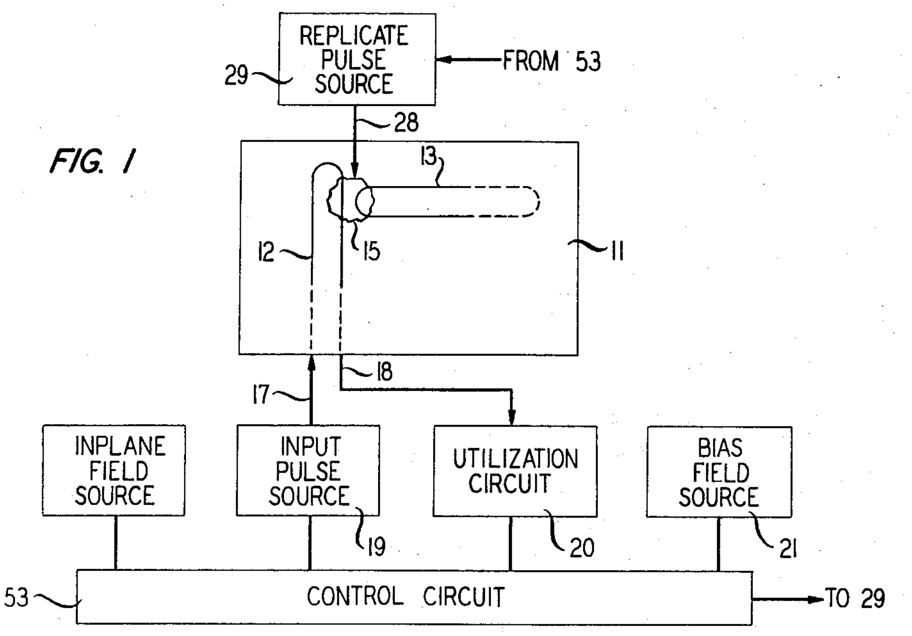
FIG. 1 is a schematic representation of a portion of a memory arrangement in accordance with this invention.

FIG. 1 shows a representative portion of a magnetic memory such as a major-minor organization. The memory is defined in a layer 11 of a material in which single wall domains can be moved. A representative major loop 12 and minor loop 13 are shown in close proximity at area 15. The loops are shown in FIG. 1 as incomplete curved lines, loop 12 being indicated as terminating at arrows 17 and 18. The arrows are shown originating and terminating at input pulse source 19 and utilization circuit 20, respectively, as is consistent with the major-minor organization.

Figure 2:
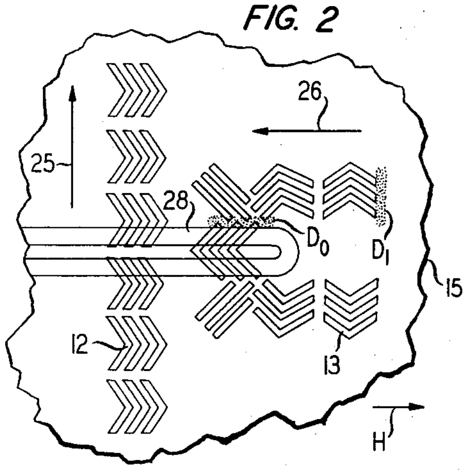
FIGS. 2, 3, 4, and 5 are schematic representations of portions of the arrangement of FIG. 1 showing magnetic conditions therein during operation.

FIG. 2 shows the details of the pattern of magnetically soft elements and a drive conductor at area 15 of FIG. 1. Each of loops 12 and 13 can be seen to be defined by chevron-shaped elements. The elements are closely spaced to one another fine grained) permitting movement of strip domains depending on the value of bias field which determines the operating diameter for domains in layer 11. The bias field is supplied by a familiar source represented by block 21 of FIG. 1. Domain movement in loops 12 and 13 is counterclockwise in response to a magnetic field rotating counterclockwise in the plane of layer 11. That movement is indicated by the arrows 25 and 26 in FIG. 2. The domains are shown as strip domains designated D0 and D1.

A hairpin-shaped electrical conductor 28 couples the portion of layer 11 also coupled by the chevron elements of loops 12 and 13 where they are in close proximity to one another. The conductor is connected to a transfer pulse source represented in FIG. 1 by block 29. The conductor is indicated in FIG. 1 by an arrow also designated 28.

A domain moving counterclockwise in loop 13 in response to the in-plane field rotations is replicated in a manner shown in the sequence of FIGS. 2, 3, 4, and 5. In FIG. 2, the in-plane field is directed to the right as indicated by arrow H. Domain D0 is assumed to be in a position adjacent conductor 28, at this juncture, as shown in FIG. 2. The in-plane field rotates to a leftward direction as indicated by arrow H in FIG. 3 moving domain D0 into the area encompassed by the hairpin-shape of conductor 28. Conductor 28 is driven at this juncture, by a pulse (Is) of a polarity to strip out domain D0 into the shape shown in FIG. 3. It is to be noted that domain D0 is elongated to extend beneath the chevron elements of both loops 12 and 13. It is to be noted further that the chevron elements are disposed so that field (H) at this time produces attracting poles in loops 12 and 13 in a manner consistent with the elongated domain in FIG. 3.

Figure 4:
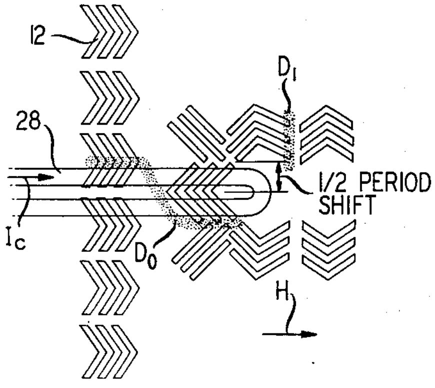

FIG. 4 shows the in-plane field next rotating again to a rightward direction, the pulse on conductor 28 being terminated prior to this reorientation of the in-plane field. Domain D0 in response is distorted into the shape shown in FIG. 4 one portion of the domain moving to one side of conductor 28 along loop 12 while the other portion of the domain moves from conductor 28 in the opposite direction along loop 13. Note that the chevron elements exhibit poles of a polarity to constrict a domain within the hairpin-shaped conductor in response to this orientation of the in-plane field.

Figure 5:
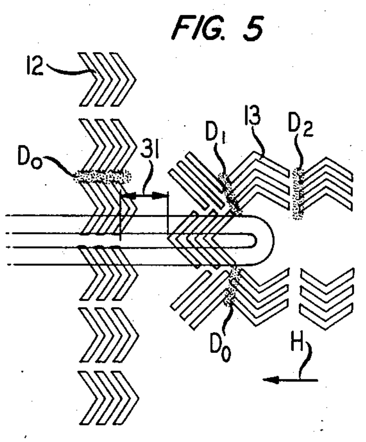

An opposite polarity pulse is now applied to conductor 28 as indicated by the arrow Ic (c for cut) in FIG. 4. This is to be compared to the arrow Is (s for strip) in FIG. 3. The current generates a field of a polarity to constrict a domain and of a value to effect cutting. Domain DO splits into two domains both designated D0 in FIG. 5. The original domain is so labeled in FIG. 5; the replicated domain is in loop 12. The disposition of domains in FIG. 5 is for an in-plane field directed to the left. When that field next reorients to the right, domains are positioned as shown in FIG. 2 and are readied for a next replication operation.

Figure 6:
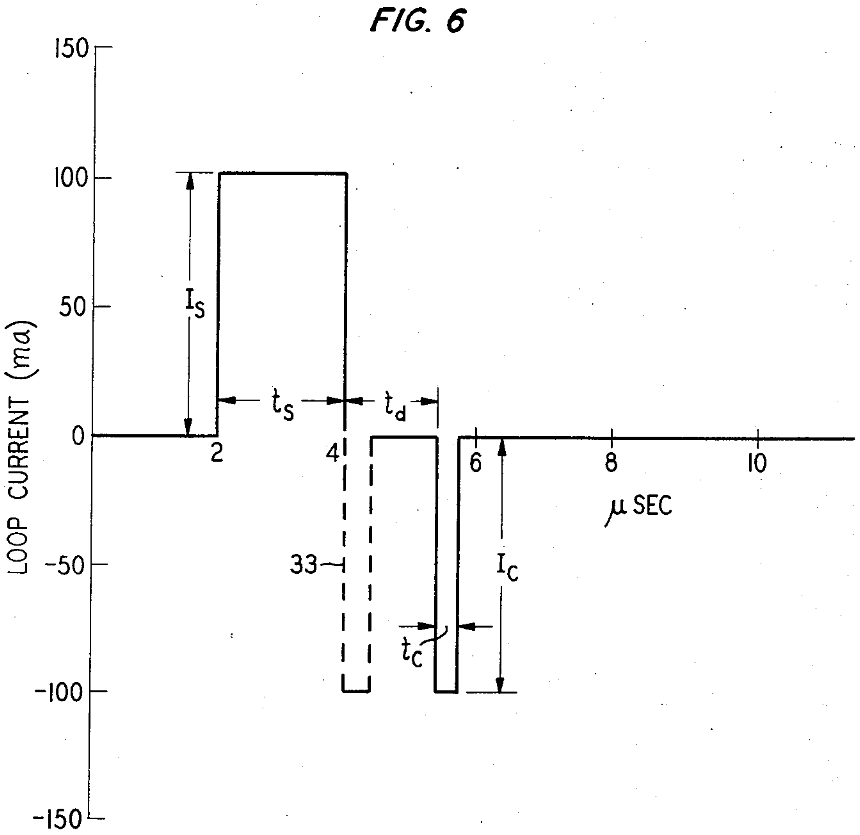
FIG. 6 is a pulse diagram for the replicate operation of the arrangement of FIG. 1.

FIG. 6 shows a pulse diagram for conductor 28 during a replication operation. Current Is is represented as a positive pulse of relatively long duration (2 microseconds) Ts. Current Ic is shown as a negative pulse of duration Tc less than a microsecond following pulse Is by a time Td determined by the timing of the in-plane field to rotate 180°. This timing accounts for the change in geometry of domain D0 (compare FIGS. 3 and 4) necessary for cutting to occur.

Of course, if a domain (D0) is absent at the position shown in FIG. 2, no replication occurs. Thus, information is replicated from a minor loop into the major loop as described.

Operation of the replicate position is particularly enhanced by certain flexibilities of chevron-type, finegrained patterns. Firstly, the undulating shape of a chevron allows the elements of one loop to be closely spaced with the elements of the other loop, the distance 31 shown in FIG. 5, thus reducing the length necessary for domain D0 in FIG. 3. Further, a one-half period shift in the position of loop 13 with respect to the period of loop 12 permits even closer spacing (31) and the convenient geometry of domain D0 in FIG. 4 to result naturally. This shift can be seen by noting that a spacing between elements of loop 12 aligns with the axis of conductor 28 whereas a spacing between elements of loop 13 aligns with the edges of conductor 28. The shift is indicated in FIG. 4.

Figure 7:
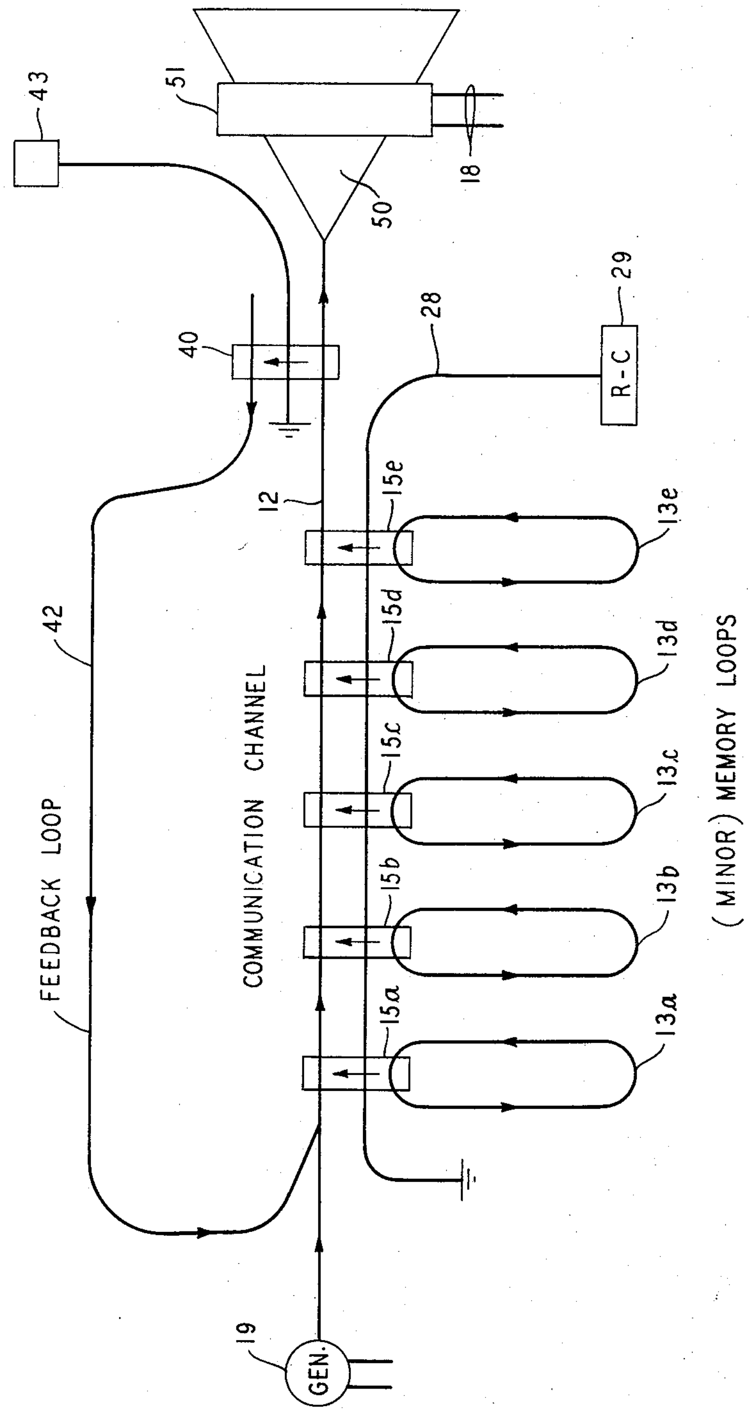
FIG. 7 is a schematic representation of a memory organized on the basis of bubble replication in accordance with this invention.

As is common to a major-minor organization, information is moved simultaneously between the major and all the minor loops. FIGS. 1–5 show a representative position at which replication occurs. FIG. 7 shows a line diagram of a modified major-minor memory based on replication. The equivalent of a major loop is designated 12 in the figure. The minor loops are designated 13*a*, 13*b*,—13*e*. The major loop may be thought of as a communication channel; the minor loops may be thought of as memory loops. Replicate positions are represented as rectangles designated 15*a* through 15*e*. The arrows in the rectangles indicate that information flow is into the communications channel for a read operation.

Figure 3:
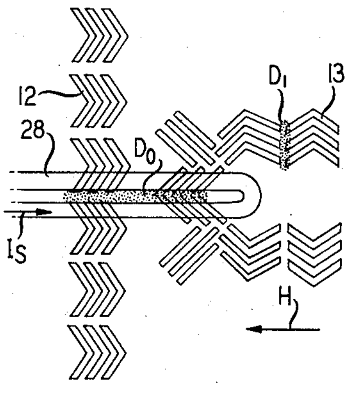

For a write operation, information replicated at replicate positions 15*i* (where *i* is a dummy variable) is cleared from memory by a "clear" pulse 33 of FIG. 6. The clear pulse is operative to annihilate domain D0 as shown in FIG. 3. Pulse 33 is of a polarity opposite to that which elongates domain D0 in FIG. 3 and follows elongating pulse at its trailing edge. A domain generator at 19 in FIG. 7 is operative to provide domains selectively in channel 12. In this manner, consistent with the majorminor memory described above, a domain pattern (information) is established in channel 12 for movement to replicators 15i. The information is replicated as described hereinbefore for storage in vacancies created in the minor loops by the preceding clear operation. In this connection, it is helpful to remember that all domain (and vacancy) movement is synchronized by the rotating in-plane field in major-minor operation.

It is also helpful to note the symmetry of domain D0 in FIG. 4. The replication operation as described generates a domain of the configuration shown in FIG. 4 regardless of whether the original domain was in loop 12 or in loop 13 to begin with.

A replicator 40 is provided in communication channel 12 of FIG. 7 to return information there to the beginning of the channel 12 via a feedback loop 42. The replicator is operative in the manner described hereinbefore in response to a pulse sequence from a driver 43 in FIG. 7. Therefore, the arrangement of FIG. 7 is completely operative as a major-minor organization. But operation is based on information (bubble) replication rather than transfer.

Information replicated or not at 40, passes to a familiar expansion detection region indicated by triangular shape 50 in FIG. 7. A domain in the region expands as it is moved to the right for detection by a magnetoresistance detector indicated at 51. The detector, in response to the presence of a domain applies a signal, via conductor 18, to utilization circuit 20 of FIG. 1.

The various sources and circuits are activated and synchronized by a control circuit represented by block 53 in FIG. 1.

Figure 8:
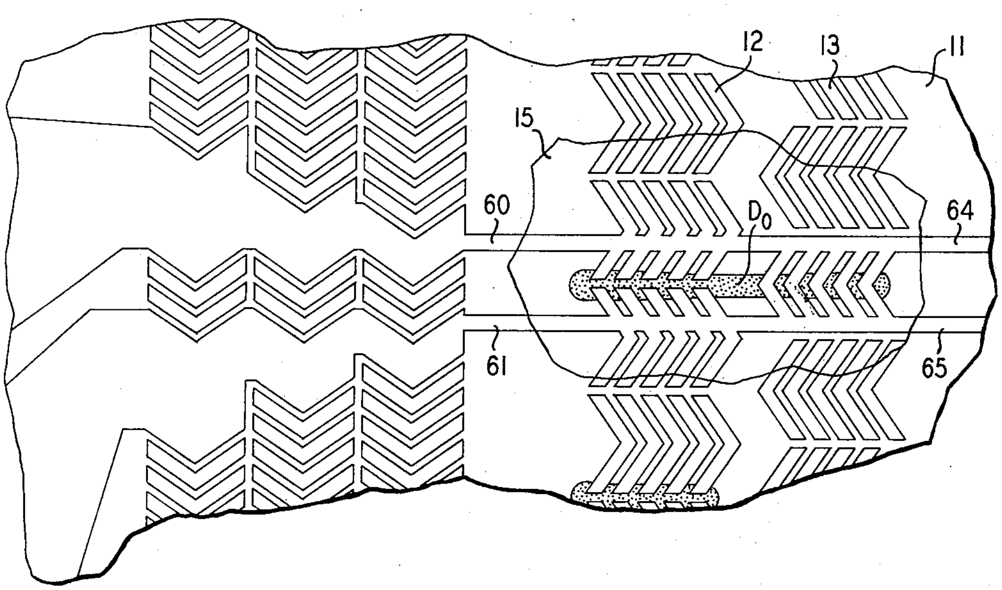
FIG. 8 is a top view of an all-permalloy pattern for a replicator in accordance with this invention.

The foregoing replicate arrangement is shown to be controlled by pulses on an electrical conductor. If advantage is taken of the fact that magnetically soft material suitable for the chevron pattern shown in, for example, FIG. 2, is typically permalloy which is also electrically conducting, the replicator can be made entirely of permalloy. FIG. 8 shows such a replicator.

The configuration shown in FIG. 8 includes an extended domain D0 corresponding to that shown in FIG. 3. The elements of loops 12 and 13 at area 15 can be seen to include straight line permalloy sections 60 and 61. These sections interconnect the peaks of the chevron elements of loop 12 and the left- and right-hand edges of one set of chevron elements in loop 13 as viewed in FIG. 8. The sections define conductor 28 in this all-permalloy embodiment. End portions 64 and 65 extend beyond the chevron elements a sufficient distance to remove any poles accumulated there from the operative region of the replicator and extend in one direction widening to form electrical lands (not shown) to which external connections are made.

Figure 9:
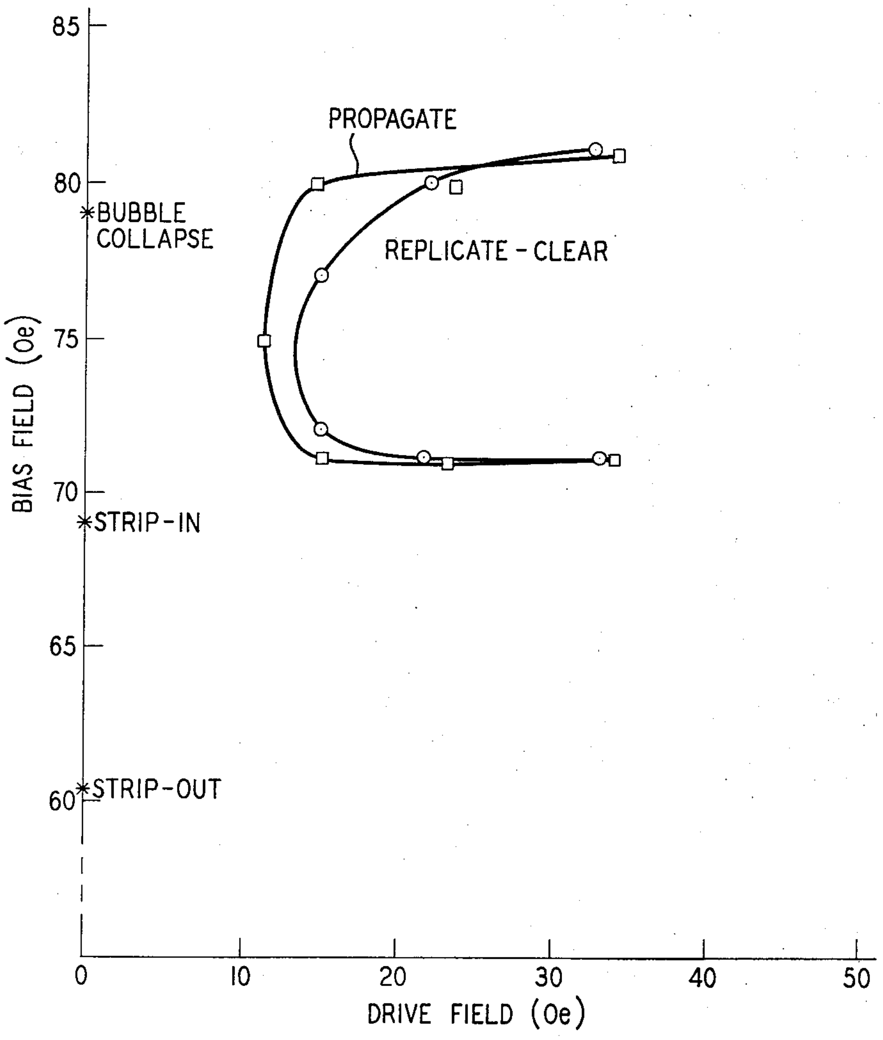
FIG. 9 is a plot of margin data for a representative replicator in accordance with this invention and for a typical propagation arrangement.

A variety of replicators of the type shown in FIG. 2 have been operated. The circuits exhibit operating ranges over essentially the entire domain propagation range. In one particular circuit, for example, a layer of $Y_1Gd_1Tm_1Ga_{.8}Fe_{4.2}O$ was formed by liquid phase epitaxial deposition techniques on a substrate of $Y_1Gd_{1.3}Tm_{.9}G_{.9}Fe_4O_{12}$) The film was 5.5 microns thick and exhibited a $4\pi M$ of 180 Gauss, a mobility of 600 cm/sec-oersteds, and a material length of 0.75 microns. Domain size was a nominal 5 microns. The bias field was varied from 68 oersteds to 82 oersteds and the drive (in-plane) field was varied from 15 oersteds to 33 oersteds. FIG. 9 shows the margin curves (bias field versus drive field). The circles represent some specific data of minor loop to major loop replication. Curve 70 represents the propagation margins for the same circuit, the squares representing some specific data on that curve. Operation was achieved in excess of 100 kilohertz.

Collapse, strip-in and strip-out bias values for a free bubble (in the absence of circuitry) are shown on the ordinate of the graph of FIG. 9 for reference.

Embodiments in accordance with the present invention comprise species of the invention disclosed in copending application Ser. No. 284,576, filed Aug. 29, 1972, for J. E. Geusic. The present invention depends on the recognition of particular advantages which arise when circuits of the type encompassed by that copending application are defined by a fine-grained pattern of elements. The advantages derive from the fact that the patterns which define two channels between which replication is to occur can be relatively closely spaced, can be operative to move information in opposite directions with respect to a replicate conductor without the presence of repelling poles to disrupt operation, can be offset one-half phase also without unwanted extraneous poles disrupting operation, and is capable of moving strip domains. Further, a considerable advantage accrues from the fact that an all-permalloy circuit can be made easily with fine-grained patterns, thus reducing processing complexity.

What is claimed is:

1. A magnetic arrangement comprising a layer of material in which single wall domains can be moved, a fine-grained periodic pattern of elements for defining first and second channels for domains in said layer, said channels being closely spaced at a replicate position, said elements being operative in response to a magnetic field reorienting in the plane of said layer to move domains in said first and second channels in first and second opposite directions respectively with respect to an axis through said replicate position, an electrical conductor coupled to said layer at said replicate position along said axis for stripping out a domain therealong between said first and second channels and for cutting said stripped out domain in response to first and second pulses when said in-plane field reorients to advance domains further along said first and second channels.

2. An arrangement in accordance with claim 1 including means for applying to said conductor pulses of first and second polarities for stripping out a domain and for cutting said stripped-out domain, respectively.

3. An arrangement in accordance with claim 2 wherein said conductor and said elements comprise the same material.

4. An arrangement in accordance with claim 3 wherein said material is permalloy.

5. An arrangement in accordance with claim 1 wherein said patterns of said first and second channels are shifted one-half period with respect to one another about an axis through said replicate position.

6. An arrangement in accordance with claim 5 wherein the elements of said first and second channels are adapted to move domains in said opposite directions from said axis.

7. An arrangement in accordance with claim 6 wherein said conductor is aligned with said axis and is operative to strip out a domain along said axis between said first and second channels there when pulsed with a pulse of a first polarity.

8. An arrangement in accordance with claim 7 wherein said conductor is operative to cut said strippedout domain in response to a pulse of a second polarity.

9. An arrangement in accordance with claim 8 wherein said elements are of chevron geometry.

10. An arrangement in accordance with claim 9 wherein said channels comprise closed loops for recirculating information thereabout.

11. An arrangement in accordance with claim 10 also including a plurality of said second channels of closed loop form each being closely spaced with respect to a different position of said first channel for forming a plurality of replicate positions therealong.

12. An arrangement in accordance with claim 11 wherein said conductor couples said plurality of replicate positions electrically in series.

13. An arrangement in accordance with claim 11 also including means for clearing domains stripped out in said replicate positions.

14. An arrangement in accordance with claim 13 wherein said means for clearing comprises means for applying to said conductor a pulse of said second polarity prior to the reorientation of said in-plane field from a direction of that field during which said pulse of said first polarity is applied.

15. An arrangement in accordance with claim 14 wherein said conductor is of hairpin-shaped geometry.

* * * * *